United States Patent
Yan

(10) Patent No.: US 11,790,054 B2
(45) Date of Patent: Oct. 17, 2023

(54) METHOD FOR LICENSE AUTHENTICATION, AND NODE, SYSTEM AND COMPUTER-READABLE STORAGE MEDIUM FOR THE SAME

(71) Applicant: BOE Technology Group Co., Ltd., Beijing (CN)

(72) Inventor: Xinquan Yan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 440 days.

(21) Appl. No.: 17/259,990

(22) PCT Filed: Mar. 31, 2020

(86) PCT No.: PCT/CN2020/082497
§ 371 (c)(1),
(2) Date: Jan. 13, 2021

(87) PCT Pub. No.: WO2021/195985
PCT Pub. Date: Oct. 7, 2021

(65) Prior Publication Data
US 2022/0012310 A1    Jan. 13, 2022

(51) Int. Cl.
*H04L 29/06* (2006.01)
*G06F 21/10* (2013.01)
(Continued)

(52) U.S. Cl.
CPC ............ *G06F 21/105* (2013.01); *H04L 9/083* (2013.01); *H04L 9/0825* (2013.01); *H04L 9/3247* (2013.01)

(58) Field of Classification Search
CPC ...... G06F 21/105; G06F 21/10; G06F 21/121; H04L 9/0825; H04L 9/083; H04L 9/3247; H04L 9/3231; H04L 9/3263; H04L 9/40
See application file for complete search history.

(56) References Cited

U.S. PATENT DOCUMENTS 7,136,838 B1 * 11/2006 Peinado .................. H04L 63/12
705/52
7,809,648 B2 * 10/2010 Misra ................. G06Q 30/0633
710/200
(Continued)

FOREIGN PATENT DOCUMENTS

CN    101541002 A  *  9/2009  ............. G06F 21/10
CN    101546366 A  *  9/2009  ............. G06F 21/10
(Continued)

OTHER PUBLICATIONS

First Office Action, including Search Report, for Chinese Patent Application No. 202080000461.2, dated Sep. 28, 2022, 26 pages.
(Continued)

*Primary Examiner* — Sher A Khan
(74) *Attorney, Agent, or Firm* — Westman, Champlin & Koehler, P.A.

(57) ABSTRACT

According to embodiments of the present disclosure, there is provided an edge authentication node, a central authentication node, a method implemented in each node, a system including each node, and a corresponding computer-readable storage medium for license authentication. The method implemented in the edge authentication node includes: receiving a license authentication request from a client node, the license authentication request includes client fingerprint information associated with the client node; decrypting, based on the client fingerprint information, a license certificate associated with the client node generated by the central authentication node, so as to obtain license information associated with the client node; and transmitting a license authentication response to the client node based at least partially on the license information obtained.

13 Claims, 4 Drawing Sheets

(51) Int. Cl.
*H04L 9/08* (2006.01)
*H04L 9/32* (2006.01)

(56) References Cited

U.S. PATENT DOCUMENTS

| | | | | |
|---|---|---|---|---|
| 8,869,289 | B2* | 10/2014 | Dubhashi | H04L 9/3273 |
| | | | | 726/26 |
| 9,325,680 | B2* | 4/2016 | Sorotokin | H04L 63/08 |
| 2003/0088784 | A1 | 5/2003 | Ginter et al. | |
| 2008/0262968 | A1* | 10/2008 | Saxena | G06F 21/10 |
| | | | | 705/51 |
| 2010/0189260 | A1* | 7/2010 | Ramanathan | H04L 63/062 |
| | | | | 380/259 |
| 2010/0191974 | A1* | 7/2010 | Dubhashi | H04L 9/3247 |
| | | | | 713/176 |
| 2012/0216269 | A1* | 8/2012 | Yeung | G06F 9/45558 |
| | | | | 726/26 |
| 2013/0124867 | A1 | 5/2013 | Clayton, II et al. | |
| 2014/0165209 | A1* | 6/2014 | Yin | H04L 63/0823 |
| | | | | 726/26 |
| 2015/0013014 | A1* | 1/2015 | Daniel | G06F 21/10 |
| | | | | 726/27 |
| 2016/0246985 | A1* | 8/2016 | Burkhardt | G06F 21/12 |
| 2017/0277870 | A1 | 9/2017 | Etchegoyen | |
| 2017/0357784 | A1* | 12/2017 | Duda | G06F 21/105 |
| 2019/0306157 | A1 | 10/2019 | Lores et al. | |

FOREIGN PATENT DOCUMENTS

| | | | | |
|---|---|---|---|---|
| CN | 103237235 | A | | 8/2013 |
| CN | 108833114 | A | | 11/2018 |
| CN | 109003083 | A | | 12/2018 |
| CN | 109347888 | A | | 2/2019 |
| CN | 110061851 | A | | 7/2019 |
| CN | 110569638 | A | | 12/2019 |
| CN | 110832479 | A | | 2/2020 |
| CN | 111625778 | A * | | 9/2020 |
| JP | 2004110646 | A * | 4/2004 | G06F 21/10 |
| WO | 92/20022 | A1 | | 11/1992 |
| WO | WO-0174138 | A2 * | 10/2001 | G06F 21/105 |
| WO | WO-2020237070 | A1 * | 11/2020 | G06F 21/105 |

OTHER PUBLICATIONS

Communication pursuant to Rules 70(2) and 70a(2) EPC, for European Patent Application No. 20900708.7, dated May 10, 2023, 1 page.

Extended European Search Report, for European Patent Application No. 20900708.7, dated Apr. 21, 2023, 9 pages.

* cited by examiner

METHOD FOR LICENSE AUTHENTICATION, AND NODE, SYSTEM AND COMPUTER-READABLE STORAGE MEDIUM FOR THE SAME

CROSS-REFERENCE TO RELATED APPLICATION

This application is a 371 National Stage Application of International Application No. PCT/CN2020/082497, filed on Mar. 31, 2020, which has not yet published, the content of which is incorporated herein by reference in its entirety.

TECHNICAL FIELD

The present disclosure relates to a field of license authentication, and more specifically to an edge authentication node, a central authentication node, a method implemented in these nodes, a system including each node, and a corresponding computer-readable storage medium for license authentication.

BACKGROUND

The current wave of big data has spread from Internet companies to traditional industries, and more and more companies are beginning to embrace the dividends brought by big data. In today's era of big data, data security is undoubtedly one of the important guarantees for enterprise development. In addition, it involves commercial secrets. If these data cannot be preserved, the development of enterprise cannot be effectively guaranteed, and it will fall into crisis at any time. Therefore, privatization deployment has become the first choice for many data-sensitive companies. Many software vendors took advantage of the trend to propose plans for privatization deployment. Mature commercial software has requirements for licensing. Due to the multiple challenges of privatization deployment such as network restrictions and security restrictions, the license authentication schemes of commercial software have encountered unprecedented challenges.

The schemes currently used for license authentication are roughly divided into two categories. One is to use a local verification module after the customer purchases and installs the software. For example, a built-in local license verification module may be provided in the software. It can perform decryption and verification functions based on the license information provided by the customer (for example, the serial number obtained by the customer from the retailer selling the software, etc.). However, the decryption and verification algorithms used in this license authentication scheme are relatively single and fixed, and are easily cracked by reverse engineering, and therefore have relatively poor security.

Another popular category of license authentication method is to adopt a software-authorized authentication center. After the customer purchases and installs the software, when the software is installed, deployed and initialized, the customer provides pre-allocated license information (for example, files, authorization codes, etc.), and transmits an authentication request to a remote cloud authentication center. The authentication center performs unified standardized authentication. Authentications for all customers depend on the services of the cloud authentication center and the cases of network transmission. However, in this scheme, on the one hand, the communication with the authentication center may be intercepted by a third party, and on the other hand, in many cases, many customers adopt a private environment as described above, and therefore any host in the environment is unable to access the public network, and thus cannot access the cloud authentication center.

SUMMARY

According to a first aspect of the present disclosure, there is provided a method implemented in an edge authentication node for license authentication. The method includes: receiving a license authentication request from a client node, the license authentication request comprises client fingerprint information associated with the client node; decrypting, based on the client fingerprint information, a license certificate associated with the client node generated by a central authentication node, so as to obtain license information associated with the client node; and transmitting a license authentication response to the client node based at least partially on the license information obtained.

In some embodiments, the decrypting, based on the client fingerprint information, a license certificate associated with the client node generated by a central authentication node comprises: determining a decryption key for the client node based on the client fingerprint information; and decrypting the license certificate by using the decryption key.

For example, the method further includes: subsequent to the decrypting, based on the client fingerprint information, a license certificate associated with the client node generated by a central authentication node, extracting client public key information from the client fingerprint information; authenticating the license certificate by using the client public key information; and extracting license information in the license certificate, in response to the license certificate being authenticated successfully.

For example, the authenticating the license certificate by using the client public key information includes authenticating at least one of: whether a digital signature of the license certificate is legal or not; whether an issuing authority of the license certificate is a legal issuing authority or not; and whether a validity period of the license certificate has not expired.

For example, the extracting license information in the license certificate includes extracting at least one of an issuing authority, an authorization type, an authorization quantity, an authorization object, and authorization product information in the license certificate.

For example, the transmitting a license authentication response to the client node based at least partially on the license information obtained includes: transmitting the license authentication response to the client node based at least partially on the license information extracted, so as to permit the client node to perform a configuration based on the license information.

For example, the method further includes: subsequent to the receiving a license authentication request from the client node, forwarding the license authentication request to the central authentication node; and receiving a central license authentication response in response to the license authentication request from the central authentication node, wherein the transmitting a license authentication response to the client node based at least partially on the license information obtained includes: transmitting a license authentication response to the client node based on the license information obtained and the central license authentication response received from the central authentication node.

For example, the license information is acquired by the edge authentication node from the central authentication node in an offline mode.

For example, the offline mode includes at least one of a physical file, a short message, an e-mail, or a portable memory.

For example, the license certificate is generated according to a JavaScript Object Notation (JSON) Web Token (JWT) protocol.

For example, the license authentication request is a stateless request based on HTTP/HTTPs.

For example, the edge authentication node and the client node are deployed at the same physical hardware.

For example, the method further includes: recording, at the edge authentication node, log data of a license authentication session related to the license authentication request, in response to the license authentication request being received from the client node.

For example, the client fingerprint information is identity authentication information for uniquely identifying and authenticating the client node.

For example, the method further includes: collecting information about at least one of the edge authentication node, the client node and the license certificate; and uploading the collected information to the central authentication node.

According to a second aspect of the present disclosure, there is provided an edge authentication node for license authentication, including: a processor; and a memory having instructions stored thereon that, when executed by the processor, cause the processor to perform the method described above.

According to a third aspect of the present disclosure, there is provided a method implemented in a central authentication node for generating a license certificate. The method includes: receiving a license certificate generation request for generating a license certificate associated with the client node; generating the license certificate associated with the client node based on request information included in the license certificate generation request; and providing the license certificate to an edge authentication node associated with the client node, for subsequent authentication for the edge authentication node.

For example, the request information includes: identify information associated with the client node; and product information associated with a product to be authenticated at the client node.

For example, the identify information includes at least one of an e-mail, a telephone number, a social unified credit code, and an identify number.

For example, the license certificate includes at least one of: an issuing authority, an authorization term, an authorization type, an authorization quantity, an authorization object, authorization product information, and a digital signature.

For example, the generating the license certificate associated with the client node based on request information included in the license certificate generation request includes: generating an asymmetric key pair associated with the client node based on the request information, the asymmetric key pair includes a client public key and a client private key; generating one or more portions of the license certificate other than the digital signature based on the request information, so that the one or more portions include information for bonding the identify information and the product information; and performing a digital signature processing on the one or more portions of the license certificate other than the digital signature by using the client private key, so as to generate the digital signature.

For example, the method further includes: encrypting the license certificate by using an encryption key associated with the client node agreed in advance with the edge authentication node.

For example, the method further includes: receiving a forwarded license authentication request from the edge authentication node; authenticating the license certificate associated with the client node based on client fingerprint information associated with the client node included in the license authentication request; and transmitting a central license authentication response to the edge authentication node based on a result of authentication.

For example, the client fingerprint information is identity authentication information for uniquely identifying and authenticating the client node.

For example, the method further includes: receiving information about at least one of the edge authentication node, the client node and the license certificate; and performing a statistical analysis on the received information.

For example, the method further includes: performing a remote management function on the edge authentication node, the remote management function includes at least one of lock, offline, upgrade, configuration, or restart.

According to a fourth aspect of the present disclosure, there is provided a central authentication node for license authentication, including: a processor; and a memory having instructions stored thereon that, when executed by the processor, cause the processor to perform the method described above.

According to a fifth aspect of the present disclosure, there is provided a system for license authentication, including the central authentication node described above, the edge authentication node described above, and one or more client nodes.

According to a sixth aspect of the present disclosure, there is provided a computer-readable storage medium for storing instructions. The instructions when executed by one or more processors cause the one or more processors to perform the method described above.

BRIEF DESCRIPTION OF THE ACCOMPANYING DRAWINGS

Preferred embodiments of the present disclosure will be described below in conjunction with the accompanying drawings to make the above and other objectives, features and advantages of the present disclosure clearer, among which:

DETAILED DESCRIPTION

Figure 1:
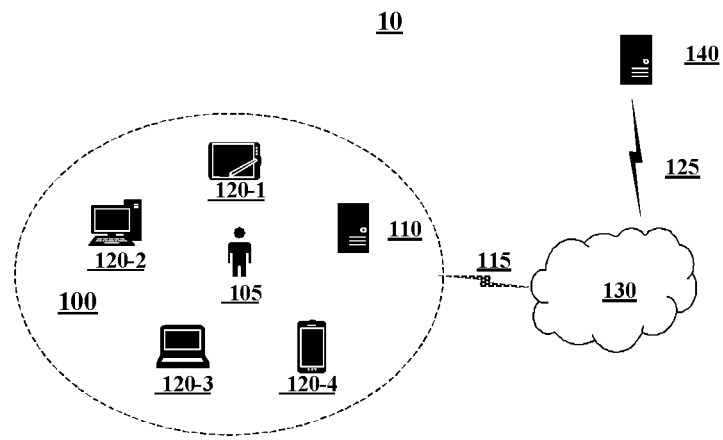
FIG. 1 is a schematic diagram showing an example application scenario for license authentication according to an embodiment of the present disclosure.

The preferred embodiments of the present disclosure will be described below in detail with reference to the accompanying drawings. Details and functions that are unnecessary for the present disclosure are omitted in the description to prevent confusion in the understanding of the present disclosure. In the present specification, the following various embodiments for describing the principle of the present disclosure are merely illustrative, and should not be construed as limiting the scope of the disclosure in any way. The following description with reference to the accompanying drawings is used to help a comprehensive understanding of exemplary embodiments of the present disclosure defined by the claims and their equivalents. The following description includes a variety of specific details to help understanding, but these details should be considered only exemplary. Therefore, those ordinary skilled in the art should recognize that various changes and modifications can be made to the embodiments described herein without departing from the scope and spirit of the present disclosure. In addition, for clarity and brevity, descriptions of well-known functions and structures are omitted. In addition, throughout the accompanying drawings, the same reference numerals are used for the same or similar functions and operations.

As mentioned above, in order to overcome or at least alleviate the problems in the license authentication schemes in the related art, there is proposed an edge authentication node, a central authentication node, a method implemented in each node, a system including each node, and a computer-readable storage medium for license authentication according to the embodiments of the present disclosure. A license authentication scheme for realizing the privatization deployment of enterprise software is proposed. It solves the shortcomings that the software built-in authentication module is fixed and single, and also solves the problem of the license authentication in a private environment with restricted networks.

In some embodiments, the license authentication scheme adopts a technology based on JSON (JavaScript Object Notation) Web Token (JWT). It is an Internet standard for creating JSON-based access tokens. For example, the server may generate a token and provide it to the client. The token corresponds to "log in as an administrator". The client may use the token to prove that it can log in as an administrator. The token may be digitally signed by the server's private key, so that both parties can verify that the token is legal.

In some embodiments, the JWT may have the following portions: header, payload, and signature. The header may include, for example, "alg" and "typ" fields or statements. The alg field may be used to, for example, indicate the algorithm used to generate the signature, and the typ field may be used to indicate the type of the token, such as "jwt", so that it may be distinguished from other JSON-based standards.

The payload field may include one or more claims. These claims may be commonly used standard fields or custom fields customized by users. Commonly used claims may include, for example (but not limited to):

| Code | Name | Description |
|---|---|---|
| iss | Issuer | The claim indicating the authority that issued the JWT. |
| sub | Subject | The claim indicating the subject of the JWT. |
| aud | Audience | The claim indicating the intended audience for this JWT. Each participant who intends to process the JWT must identify itself in the audience claim. If the participant processing the claim does not identify itself in the audience claim, it must reject the JWT. |
| exp | Expiration time | The claim indicating the expiration time, at or after which the JWT must be rejected. The value must be NumericDate: [9], an integer or a decimal, representing the number of seconds since 1970 Jan. 1 00:00:00Z. |
| nbf | Start time | The claim indicating the start time, after which the JWT starts to be accepted. The value must be NumericDate. |
| iat | Issuance time | The claim indicating the time when the JWT was issued. The value must be NumericDate. |
| jti | JWT ID | The claim indicating a token identifier that is unique even among different issuers. |

The signature verifies the security of the token itself. The signature is usually calculated by the following method: encode the header and payload using Base64url encoding and concatenate the two together by a period separator, and then encrypt the string using the encryption algorithm specified in the header (for example, HMAC-SHA256, etc.). Base64url encoding is similar to base64 encoding, but uses different non-alphanumeric characters and omits padding bits.

Finally, the three parts of the header, the payload, and the signature may be Base64url encoded separately and then concatenated with a period separator to form the final token.

For example, the following is the content of a sample JWT:

```
HEADER: //Header
{
    "alg": "HS256", //The algorithm is HMAC-SHA256
    "typ": "JWT" // JSON type is JWT
}
PAYLOAD:        //Pay load
{
    "sub": "BOE", // Specify that the subject is BOE
    "name": "Wang Dongsheng", //Custom claim, which may be, for example, the specific issuer
    "iat": "1516239022" // issuance time
}
SIGNATURE:
HMACSHA256(
    base64UrlEncode(header) + "." + // base64url encoding of the header + period separator +
    base64UrlEncode(payload), // base64url encoding of the payload
    You Are My Secret // Encryption key, optional
) secret base64 encoded
```

As can be seen from the above example, one or more of the listed standard claims do not necessarily have to be selected (for example, "nbf", "exp" and other claims), and custom claims (for example, "name" claim) may be added. How to interpret these claims or how to use these claims can be determined in advance by the issuer that issued the JWT and the party that will process the JWT.

During authentication, when the user successfully logs in to the server using his credentials, a JWT token may be returned from the server. The user stores the JWT token locally, instead of keeping a session indicating the successful login of the user on the server side and returning a cookie like the traditional authentication method.

Thereafter, whenever the user wants to access the resources associated with the server, the user agent should send the JWT without logging in again. In other words, this is a stateless (RESTful) authentication mechanism, which does not require the server to maintain the context or session related to user authentication, but only the JWT token saved by the user can perform corresponding authority management. Thus, such an authentication mechanism reduces the occupation of various resources, thereby improving efficiency and reducing load. For example, the server may not have to access the database multiple times, and the user may not have to enter credentials multiple times to log in, and so on.

Hereinafter, in some embodiments of the present disclosure, in describing the present disclosure, the license authentication method based on the JWT mechanism is illustrated by way of example. However, it should be noted that the present disclosure is not limited to this, but can be applied to any stateless authentication mechanism.

As described above, in some embodiments, a license authentication method based on the JWT mechanism that can realize the privatization deployment of enterprise software is proposed. On the one hand, it can extend the application scenarios of JWT to the field of software licensing and authorization. On the other hand, it not only solves the shortcoming that the software built-in authentication module is fixed and single, but also solves the problem of the license authentication in a private environment with restricted networks. The license authentication scheme according to the embodiment of the present disclosure will be described below in detail with reference to FIGS. 1 to 6.

FIG. 1 is a schematic diagram showing an example application scenario 10 for license authentication according to an embodiment of the present disclosure. As shown in FIG. 1, the application scenario 10 may include an enterprise private network 100, an Internet 130, and a central authentication node 140. The enterprise private network 100 may be owned, managed, and/or operated by a user 105, and it includes, for example, an edge authentication node 110 and one or more client nodes 120-1 to 120-4.

For example, the central authentication node 140 may be connected to the Internet 130 via a communication connection 125, so as to enable it to provide various corresponding services. However, although the Internet 130 is shown in FIG. 1, it should be noted that the Internet 130 is not a necessary component. In other words, in other embodiments, there may be no Internet 130 at all. For example, the central authentication node 140 may be an independent workstation that is completely offline, and its interaction with the outside is limited to operations such as U disk copying and document printing.

For example, the enterprise private network 100 may have a restricted communication connection 115 with the Internet 130. For example, the restricted communication connection 115 may be that internal resources of the network (for example, the edge authentication node 110, the client nodes 120-1 to 120-4, etc.) cannot access external resources (for example, the central authentication node 140), or external resources cannot access internal resources, or both. In addition, the restricted communication connection 115 may also be a restricted communication connection for one or more network services and one or more network addresses. For example, internal resources may only be allowed to access external resources with specified network addresses, or vice versa. For another example, only certain network services of internal resources (for example, DNS resolution, HTTP session, etc.) may be allowed to access external resources, or vice versa. In other words, the enterprise private network 100 may not have access to external resources, and further may not be able to perform license authentication for the software installed on its client nodes 120-1 to 120-4, for example, in a traditional software authentication center model. However, it should be noted that the present disclosure is not limited to this. In other embodiments, the enterprise private network 100 may have an unrestricted communication connection with the Internet 130, so that the internal resources and external resources of the enterprise private network 100 can access each other without restriction.

For example, the client nodes 120-1 to 120-4 (hereinafter collectively referred to as the client node 120 when not specified) may be, for example, a tablet computer (for example, the client node 120-1), a desktop computer (for example, the client node 120-2), a laptop (for example, the client node 120-3), a smart phone (for example, the client node 120-4), or any other electronic device on which software application can be installed, deployed and/or configured. However, it should be noted that although four different electronic devices are shown in FIG. 1, the present disclosure is not limited thereto. In other embodiments, there may be one or more or one or more types of electronic devices acting as the client nodes, and even the client nodes 120 may be one or more virtual client nodes running on the same physical machine.

In addition, in some embodiments, the edge authentication node 110 and the client node 120 may also be located at the same physical hardware. In the case where the edge authentication node 110 and the client node 120 are located at the same physical hardware, the hardware cost of deploying the license authentication scheme according to the embodiment of the present disclosure can be significantly reduced. For example, in the case where all the hardware of the user 105 are isolated terminals that are not connected to the Internet, if the edge authentication node 110 cannot be located at the same physical hardware as the client node 120, then when installing the application product on each isolated terminal, it is necessary to provide a dedicated edge authentication node device, which undoubtedly increases the user's hardware cost. However, in this case, by integrating the edge authentication node 110 and the client node 120 at the same physical hardware, for example, by installing the software of the edge authentication node 110 at the same physical hardware or integrating it into the software of the client node 120, the deployment costs can be significantly reduced.

Hereinafter, the functional modules in each node will be described in detail with reference to FIG. 2, and the interaction between various nodes in the license authentication will be described in detail with reference to FIG. 3.

Figure 2:
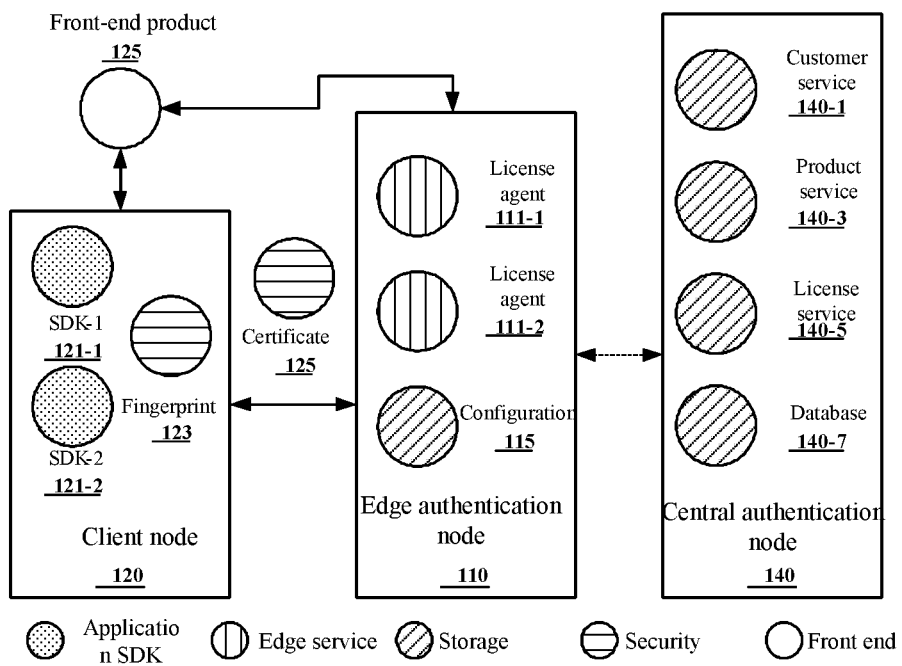
FIG. 2 is a schematic diagram showing functional modules of each node for license authentication according to an embodiment of the present disclosure.

FIG. 2 is a schematic diagram showing functional modules of each node for license authentication according to an embodiment of the present disclosure. As shown in FIG. 2, the central authentication node 140 may have at least one of the following functional modules: a customer service module 140-1, a product service module 140-3, a license service module 140-5, and a database 140-7. It should be noted that although these service modules are shown in FIG. 2 as being located in the same node, these functional modules can actually be scattered at one or more physical hardware, and even the same functional module itself can be scattered and implemented in multiple physical hardware.

Those skilled in the art will understand that the various exemplary functional modules described in conjunction with the disclosure herein may be implemented as electronic hardware, computer software, or a combination of both. In order to clearly illustrate this interchangeability of hardware and software, functions of various illustrative components, blocks, modules, circuits, and steps have been described in general terms. Whether these functions are implemented as software or hardware depends on specific applications and design constraints imposed on the entire system. Those skilled in the art may implement the described functions in various ways for each specific application, but such implementation should not be interpreted as causing a departure from the scope of the present disclosure. In addition, as described below with reference to FIG. 6, one or more of these functional modules may be implemented by the electronic device 600 shown in FIG. 6 in combination with corresponding software.

The customer service module 140-1 may be used to manage customer information. For example, the customer service module 140-1 may provide: customer information registration, customer information modification, customer information deletion, and other customer information maintenance and management tasks. More specifically, it may manage related information of a specified customer, such as a name, a postal address, an email address, a social unified credit code, a customer type, and other customer-related information (for example, registration time, whether there are arrears, etc.).

The product service module 140-3 may be used to manage product information. For example, the product service module 140-3 may provide: product information registration, product information modification, product information deletion, and other product information maintenance and management tasks. More specifically, it may manage related information of a specified product, such as a product name, a product version, a product quantity, a product price, and other product-related information (for example, product validity period, etc.). In some embodiments, the product may be, for example, any software application that requires license authentication, such as Microsoft's Office series products, Windows series products, Symantec's Norton antivirus software series products, BOE's advertising publishing machine, and software in the art screen series products and so on. The license service module 140-5 may provide a license service for one or more products required by a specified customer, and issue it to the corresponding customer in the form of a license certificate. The specific details will be described in detail in other embodiments below.

The database 140-7 may be a centralized or distributed security database, which may store data information related to the foregoing various modules. For example, it may save key information unique to each user to ensure the security of the enterprise certificate. In contrast, in the embodiment shown in FIG. 2, the edge authentication node 110 itself does not store the user's key information, so as to prevent it from leaking related information if it is cracked.

As shown in FIG. 2, the edge authentication node 110 may have at least one of the following functional modules: one or more license agent modules 111-1, 111-2 and a configuration module 115. The license agent module 111 of the edge authentication node may be responsible for authenticating the license certificate associated with the client node 120 issued by the central authentication node 140, and extracting relevant information and returning it to the client node 120 or a front-end product 125. After that, the client node 120 may cache the result to a memory or hard disk. In addition, any log data associated with this authentication may also be recorded on the edge authentication node 110 (for example, the number of licensing, the time of licensing, the result of licensing and other information). In addition, two license agents 111-1 and 111-2 are shown in FIG. 2, which may be agents that perform different processing for different customers and/or different products. For example, the license agent 111-1 may be a license agent for a product 1 of a customer 1, and the license agent 111-2 may be a license agent for a product 2 (if any) of a customer 2 (if any) or a license agent for the product 2 of the same customer 1 (if any). Different license agents 111-1 and 111-2 may respectively correspond to different SDK-1 121-1 and SDK-2 121-2 in the client node.

As shown in FIG. 2, the client node 110 may have at least one of the following functional modules: one or more SDKs (software development kits) 121-1, 121-2 and fingerprint information of the client node 120. Here, SDK-1 121-1 and SDK-2 121-2 may be SDKs for different applications and/or different versions of application. For example, in the case where the client node 120 is a Windows operating system, SDK-1 121-1 may be, for example, a static library based on the C language in the product 1, and SDK-2 121-2 may be, for example, a dynamic library based on the Java language in another product 2. Alternatively, in the case where the client node 120 is a dual operating system platform, SDK-1 121-1 and SDK-2 121-2 may be different versions of corresponding software under each operating system platform. In addition, fingerprint information 123 may be data information for uniquely identifying the client node 120 (or more generally, uniquely identifying the user 105 associated with the client node 120). For example, it may be a unique identification number generated by the central authentication node during the license registration, a social unified credit number assigned by the state, an email address, an ID number, and the like. In addition, in some embodiments, the fingerprint information may also include, for example, public key information held by the client node 120, so that a third party who receives the fingerprint information can verify any digital signature associated with the client node 120. In addition, in some embodiments, the fingerprint information may also be public key information or any information from which public key information can be derived. Therefore, the term "client fingerprint information" used in some embodiments of the present disclosure may be identity authentication information for uniquely identifying and authenticating the corresponding client node.

Therefore, the client node 120 may transmit the fingerprint information to the edge authentication node 110 to request the edge authentication node 110 to authenticate the license certificate associated with the client node 120 issued by the central authentication node 140, and obtain license 125 for software installation and configuration. In addition, the client node 120 may also adjust the related functions of the front-end product 125 according to the corresponding configuration permitted. For example, in the case where the front-end product is a booth terminal, the relevant settings and/or restrictions of its display pages, menus, and buttons can be adjusted if the license authentication is successful.

In some embodiments, in addition to being used for license authentication, the edge authentication node 110 may also be used to collect information of interest related to the edge authentication node 110 (for example, the edge authentication node 110 may log each license authentication processing, or count data such as license authentication frequency and success rate), and/or upload the information of interest to the central authentication node 140. Correspondingly, the central authentication node 140 may be responsible for information collection, statistical functions (for example, statistical processing of the information of multiple edge authentication nodes 110, etc.), and can also remotely lock, offline, and upgrade the edge authentication node 110, so as to facilitate the management, configuration, and maintenance for the edge authentication node 110 by the central authentication node 140.

Figure 3:
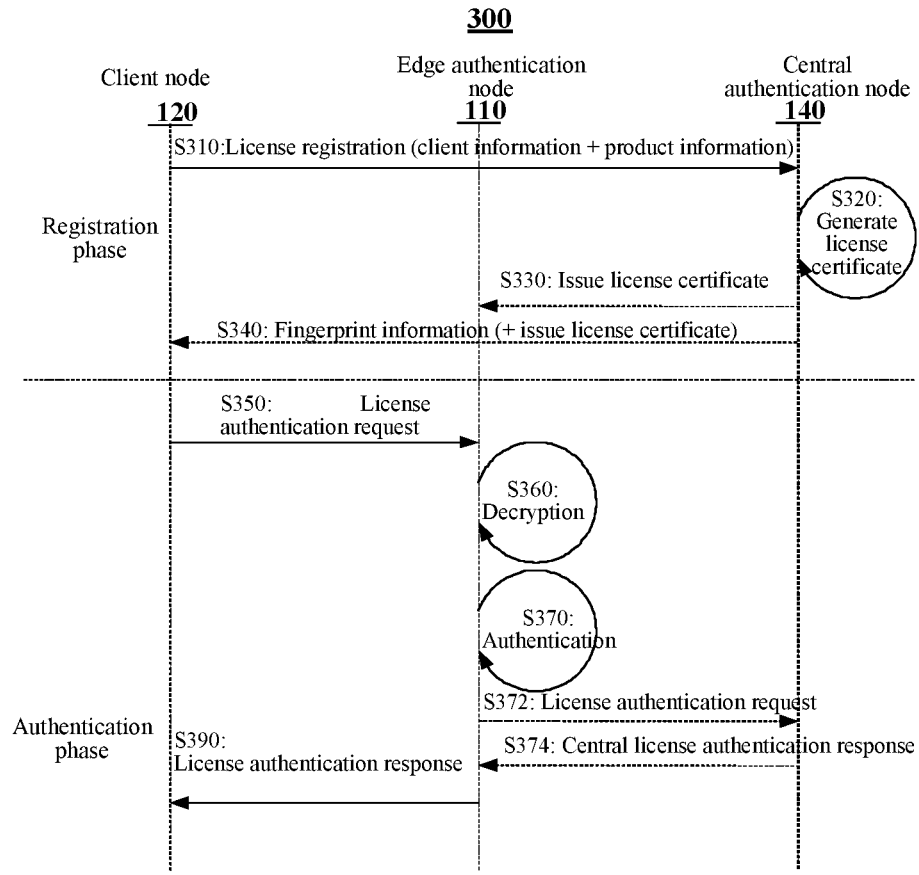
FIG. 3 is a flowchart showing a process for license authentication between various nodes according to an embodiment of the present disclosure.

FIG. 3 is a flowchart showing a process 300 for license authentication between the various nodes according to an embodiment of the present disclosure. As shown in FIG. 3, the license authentication scheme according to the embodiment of the present disclosure can be roughly divided into two phases: a registration phase and an authentication phase. In the registration phase, the central authentication node 140 may generate the enterprise license certificate based on the information (for example, including the social unified credit code, ID number, telephone number, and/or email address of the relevant company) provided by the user (for example, the user 105 shown in FIG. 1) and the product information selected by the user. Then, the enterprise license certificate may be safely distributed to the user through an offline method (for example, a physical printed file, an USB flash drive, an email, etc.). Afterwards, in the authentication phase, the user may activate the corresponding product in accordance with the authentication guideline.

Specifically, in the registration phase, the client node 120 may initiate a license registration to the central authentication node 140 in step S310. For example, the client node 120 may transmit a license certificate generation request to the central authentication node 140 via various methods (for example, physical printed files, online electronic applications, etc.). The license certificate generation request may include request information associated with the client node 120. The request information may include, for example, identity information associated with the client node 120 and product information associated with the product to be authenticated at the client node 120. In some embodiments, the identify information may include at least one of an e-mail, a telephone number, a social unified credit code, or an identify number. In addition, in some embodiments, the product information may include, for example, at least one of a name, version, quantity, type, etc. of the product to be authenticated.

Next, in step S320, the central authentication node 140 may generate a license certificate associated with the client node 120 based on request information included in the license certificate generation request. In some embodiments, step S320 may include: generating an asymmetric key pair associated with the client node based on the request information, the asymmetric key pair includes a client public key and a client private key. The asymmetric key pair may be used to, for example, generate a digital signature of the license certificate, and encrypt the license certificate. In addition, step S320 may further include: generating one or more portions of the license certificate other than the digital signature based on the request information, so that the one or more portions include information for binding identity information and product information. For example, in the license certificate, the JWT standard can be used to generate the following payload:

```
{
    "productCode": "a-b-c", //Product code
    "productName": "boe smart XX", //Product name
    "productVersion": "ALL_SUPPORTED", // Product version
    "licenseType": "Enterprise Edition", // License type
    "grantedNum": "999", //License quantity
    "iss": "https://www.cloud.boe.com", //Issuer
    "sub": "lic", //Subject
    "aud": "Consumer", //Audience
    "iat": "1562898938", //Issuance time
    "nbf": "1562898938", //Start time
```

-continued

```
    "exp": "1594521338", //Expiration time
    "jti": "string", // JWT identifier
}
```

In addition, step S320 may further include: performing a digital signature processing on the one or more portions of the license certificate other than the digital signature by using the client private key, so as to generate the digital signature.

Next, in step S330, the license certificate may be provided to the edge authentication node 110 associated with the client node 120, for subsequent authentication for the edge authentication node 110. For example, in some embodiments, after the user 105 purchases the license of the corresponding software, he can obtain the license certificate from the central certification node 140 after the authentication at the central certification node 140, as shown in step S330 indicated by the dotted arrow in FIG. 3. The license certificate can be obtained offline, for example, by a short message, U disk copy, paper printing, e-mail or any secure method. In some embodiments, the license certificate may even be directly embedded in the edge authentication node 110 owned by the user 105, for example, in the case where the edge authentication node 110 is software and/or hardware purchased from the provider of the central authentication node 140.

In addition, in some embodiments, in step S340, the central authentication node 140 may also issue a license certificate to the client node 120, thereby indirectly providing it to the edge authentication node 110. In addition, in step S340, the central authentication node 140 may also provide or allocate fingerprint information to the client node 120. As mentioned above, the fingerprint information can be used to uniquely identify the client node, and it can be, for example, an ID number, telephone number, email address, social unified credit code, or other information. In addition, the fingerprint information may also include a client key pair (a client public key and a client private key) generated by the central authentication node. In addition, in some embodiments, it is possible to only provide the client public key, because in this embodiment, the client node 120 does not need to use the client private key to perform any operations. In some embodiments, the issuance of the license certificate and/or fingerprint information can also be done offline.

In addition, in some embodiments, the license certificate generated may include at least one of the following information: an issuing authority, an authorization term, an authorization type, an authorization quantity, an authorization object, authorization product information, and a digital signature. In addition, in some embodiments, the central authentication node 140 may, in or after step S320, encrypt the license certificate by using the encryption key associated with the client node 110 agreed in advance with the edge authentication node 110. The encryption key may be, for example, the previously generated client private key or any other key (for example, the private key of the central authentication node itself).

At this point, the license registration phase has come to an end. At this time, the edge authentication node 110 and/or the client node 120 may obtain the license certificate in a secure manner.

Next, in the authentication phase, in step S350, the client node 120 may transmit a license authentication request to the edge authentication node 110, and the license authentication request may include client fingerprint information associated with the client node 120. However, in some embodiments, the client fingerprint information may be used to identify the client node 120, and thus may be, for example, the aforementioned fingerprint information. In other embodiments, the client fingerprint information may also be other information for deriving the aforementioned fingerprint information.

Next, in step S360, the edge authentication node 110 may decrypt, based on the client fingerprint information, the license certificate associated with the client node 120 generated by the central authentication node 140, so as to obtain the license information associated with the client node 120. For example, the edge authentication node 110 may determine, based on the portion in the client fingerprint information for identifying the client node 120, the license certificate corresponding to the client node 120 among the license certificates stored therein. However, the decryption key corresponding to the fingerprint information may be determined. For example, in the case where the central authentication node 140 encrypts the license certificate by using the client private key, the edge authentication node 110 may use the client public key (for example, carried in the client fingerprint information) to decrypt the license certificate accordingly. For another example, in the case where the central authentication node 140 encrypts the license certificate by using another previously agreed encryption key, the edge authentication node 110 may use the corresponding decryption key to decrypt the license certificate accordingly.

Next, in step S370, the edge authentication node 110 may extract the client public key information from the client fingerprint information, authenticate the license certificate by using the client public key information, and extract the license information in the license certificate, in response to the license certificate being authenticated successfully. For example, the edge authentication node 110 may use the client public key information to authenticate at least one of the following: whether the digital signature of the license certificate is legal or not; whether an issuing authority of the license certificate is a legal issuing authority or not; and whether a validity period of the license certificate has not expired. In addition, the edge authentication node 110 may extract at least one of an issuing authority, an authorization type, an authorization quantity, an authorization object, authorization product information of the license certificate, and configure the front-end product 125 according to these specific information, for example. In addition, in other embodiments, the edge authentication node 110 may also transmit a license authentication response to the client node 120 based at least partially on the license information extracted, so as to permit the client node 120 to perform a configuration according to the license information.

In addition, in the authentication phase, if there is a possibility of communication between the edge authentication node 110 and the central authentication node 140, for example, there is a communication link for information exchange between the two (that is, the communication is not completely restricted), then the edge authentication node 110 may additionally work in a cloud authentication mode. In this mode, the edge authentication node 110 may also forward the license authentication request (or other requests generated based on the license authentication request) to the central authentication node 140 in step S372; and receiving a central license authentication response in response to the license authentication request from the central authentication node 140. After that, the edge authentication node 110 may transmit a license authentication response to the client node 120 based on the license information obtained in step S370 and the central license authentication response received from the central authentication node 140. For example, when the central authentication node 140 finds that the user 105 associated with the client node 120 is in arrears or, for example, applies for early return of the goods, after issuing the license certificate in step S330, the previously issued license should be revoked or modified. In this case, if the edge authentication node 110 and the central authentication node 140 cannot communicate with each other, the license certificate usually cannot be revoked. Then through steps S372 and S374, the central authentication node 140 may instruct the edge authentication node 110 to revoke or modify the previously issued license certificate.

In addition, in some embodiments, when a hybrid authentication method of the above-mentioned edge authentication node 110 and central authentication node 140 is adopted, a secure communication protocol, for example, the HTTPs protocol, may be employed between the two. In addition, when a trusted communication channel exists between the two (for example, there is a virtual private network (VPN) tunnel between the two), it is also supported to use an unencrypted communication protocol, such as HTTP. However, it should be noted that the communication protocol used in the present disclosure includes but is not limited to the specific examples mentioned above. In addition, when there is no network between the edge authentication node 110 and the central authentication node 140 (for example, the edge authentication node 110 is in the restricted enterprise private network 100 shown in FIG. 1), and when the edge authentication node 120 and the client node 110 are located at the same physical hardware (for example, when the edge authentication node 120 may be built into the client node 110 as a built-in module), a local SDK direct authentication method may be adopted. For example, the communication between the two nodes may be realized through function calls (for example, library files, system function calls, etc.) therebetween.

In step S390, the edge authentication node 110 may transmit a license authentication response to the client node 120 based at least partially on the result of authentication in step S370 (and/or the central license authentication response from the central authentication node 140) to instruct the product at the client node 120 to perform a corresponding configuration. In some embodiments, the client node 120 may authorize the related application according to the license response obtained, and the application may control, for example, three levels of authorization according to the license response (but not limited to this):

1. Functional module: Restrict certain functions, which must be authorized by certain software versions;
2. Resource restriction: Restrict the quantity of resources used by certain calculation models within the scope of the software license certificate; and
3. Data restriction: Restrict the acquisition of certain data from different granularities.

Therefore, by using the above-mentioned license authentication scheme, it is possible to reduce the requirements for network authentication and provide the possibility of local authentication while ensuring the security of the license certificate.

In addition, it should be noted that the message interaction between the various nodes shown in FIG. 3 can be a three-way handshake based on the underlying Transmission Control Protocol (TCP), and the business interaction at the application layer may be carried out in a request-response manner. However, it should be noted that the present disclosure is not limited to this. For example, in other embodiments, the bottom layer may also adopt, for example, User Datagram Protocol (UDP), and the upper layer may also be implemented in a decentralized manner.

By using the method, edge authentication node, central authentication node, system and computer-readable storage medium for license authentication according to the embodiments of the present disclosure, it is possible to reduce the requirements for network authentication and provide possibility of local authentication while ensuring the security of the license certificate.

In addition, through the use of the JWT protocol framework, a lightweight scheme for edge authentication of software licenses is realized, which has the following advantages: 1) there is no central dependence, and edge authentication may be rapidly performed; 2) an edge device system is supported; 3) asymmetric encryption ensures the security of license data; 4) technology and SDK are neutral, and any technology framework can be accessed as long as it supports JWT and HTTP protocols.

Figure 4:
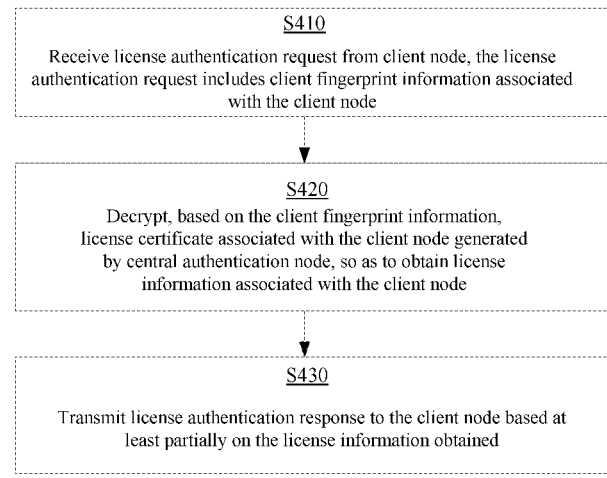
FIG. 4 is a flowchart showing an example method implemented in an edge authentication node for license authentication according to an embodiment of the present disclosure.

FIG. 4 is a flowchart illustrating an example method 400 implemented in the edge authentication node 110 for license authentication according to an embodiment of the present disclosure. As shown in FIG. 4, the method 400 may include steps S410, S420, and S430. However, it should be noted that although only three steps are shown in FIG. 4, the method 400 may include more, fewer or different steps, and the order of execution of these steps may not strictly follow the order shown in FIG. 4.

As shown in FIG. 4, the method 400 may include step S410. In step S410, a license authentication request may be received from the client node 120, and the license authentication request may include client fingerprint information associated with the client node 120.

In step S420, the license certificate associated with the client node 120 generated by the central authentication node 140 may be decrypted based on the client fingerprint information, so as to obtain license information associated with the client node 120.

In step S430, a license authentication response may be transmitted to the client node 120 based at least partially on the license information obtained.

In some embodiments, step S420 may include: determining a decryption key for the client node based on the client fingerprint information; and decrypting the license certificate by using the decryption key. In some embodiments, the method 400 may further include: subsequent to step S420, extracting client public key information from the client fingerprint information; authenticating the license certificate by using the client public key information; and extracting the license information in the license certificate, in response to the license certificate being authenticated successfully. In some embodiments, the authenticating the license certificate by using the client public key information includes authenticating at least one of: whether a digital signature of the license certificate is legal or not; whether an issuing authority of the license certificate is a legal issuing authority or not; and whether a validity period of the license certificate has not expired. In some embodiments, the extracting license information in the license certificate includes extracting at least one of an issuing authority, an authorization type, an authorization quantity, an authorization object, and authorization product information in the license certificate. In some embodiments, step S430 may include: transmitting a license authentication response to the client node 120 based at least partially on the license information extracted, so as to permit the client node 120 to perform a configuration according to the license information.

In some embodiments, the method 400 may further include: subsequent to step S410, forwarding the license authentication request to the central authentication node 140; and receiving a central license authentication response in response to the license authentication request from the central authentication node 140, where step S430 may include: transmitting the license authentication response to the client node 120 based on the license information obtained and the central license authentication response received from the central authentication node 140. In some embodiments, the license certificate may be obtained by the edge authentication node 110 from the central authentication node 140 in an offline mode.

In some embodiments, the offline mode may include at least one of a physical file, a short messages, an email, and a portable memory. In some embodiments, the license certificate may be generated according to a JWT protocol. In some embodiments, the authentication license request may be a stateless request based on HTTP/HTTPs. In some embodiments, the edge authentication node 110 and the client node 120 may be deployed at the same physical hardware. In some embodiments, the method 400 may further include: recording, at the edge authentication node 120, log data of a license authentication session related to the license authentication request, in response to the license authentication request being received from the client node 120. In some embodiments, the client fingerprint information is identity authentication information for uniquely identifying and authenticating the client node. In some embodiments, the method 400 may further include: collecting information about at least one of the edge authentication node 110, the client node 120 and the license certificate; and uploading the collected information to the central authentication node 140.

In addition, it should be noted that in some embodiments, the term "offline" used may refer to that a different method from the method of initiating a license application or registration is adopted to issue the license certificate. For example, when the client node 120 performs license registration through the Internet (for example, through a browser, or more specifically through the HTTP/HTTPs protocol), the central authentication node 140 may issue the license certificate by means of, for example, e-mail, mailing physical prints, mailing U disks, or the like. In this sense, it is similar to the term "out-of-band communication" used in communication systems. In other words, by using different communication methods in the two processes of license registration and license issuance, security can be effectively improved and risks such as man-in-the-middle attacks can be reduced.

Figure 5:
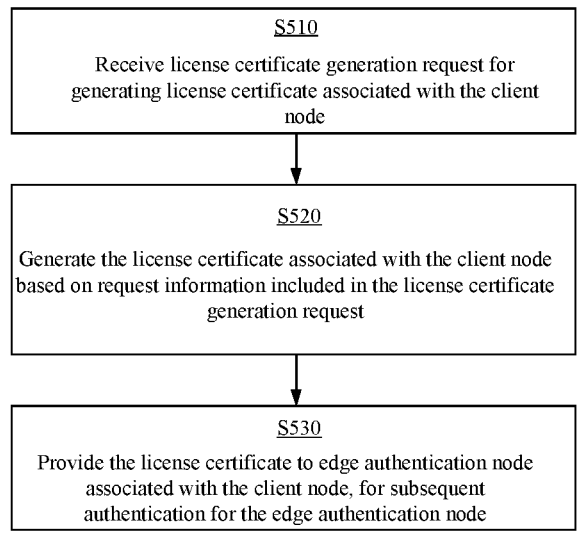
FIG. 5 is a flowchart showing an example method implemented in a central authentication node for generating a license certificate according to an embodiment of the present disclosure.

FIG. 5 is a flowchart illustrating an example method 500 for generating a license certificate implemented in the central authentication node 140 according to an embodiment of the present disclosure. As shown in FIG. 5, the method 500 may include steps S510, S520, and S530. However, it should be noted that although only three steps are shown in FIG. 5, the method 500 may include more, fewer or different steps, and the order of execution of these steps may not strictly follow the order shown in FIG. 5.

As shown in FIG. 5, the method 500 may include step S510. In step S510, a license certificate generation request for generating a license certificate associated with the client node 120 may be received.

In step S520, the license certificate associated with the client node 120 may be generated based on the request information included in the license certificate generation request.

In step S530, the license certificate may be provided to the edge authentication node 110 associated with the client node 120, for subsequent authentication for the edge authentication node 110.

In some embodiments, the request information may include: identify information associated with the client node 120; and product information associated with a product to be authenticated at the client node 120. In some embodiments, the identify information may include at least one of an e-mail, a telephone number, a social unified credit code, and an identify number. In some embodiments, the license certificate includes at least one of: an issuing authority, an authorization term, an authorization type, an authorization quantity, an authorization object, authorization product information, and a digital signature. In some embodiments, step S520 may include: generating an asymmetric key pair associated with the client node 120 based on the request information, the asymmetric key pair includes a client public key and a client private key; generating one or more portions of the license certificate other than the digital signature based on the request information, so that the one or more portions include information for binding identity information and product information; performing a digital signature processing on the one or more portions of the license certificate other than the digital signature by using the client private key, so as to generate the digital signature. In some embodiments, the method 500 may further include: encrypting the license certificate by using an encryption key associated with the client node agreed in advance with the edge authentication node 110. In some embodiments, the method 500 may further include: receiving a forwarded license authentication request from the edge authentication node 110; authenticating the license certificate associated with the client node 120 based on the client fingerprint information associated with the client node 120 included in the license authentication request; and transmitting a central license authentication response to the edge authentication node 110 based on a result of authentication. In some embodiments, the client fingerprint information is identity authentication information for uniquely identifying and authenticating the client node. In some embodiments, the method 500 may further include: receiving information about at least one of the edge authentication node 110, the client node 120 and the license certificate; and performing a statistical analysis on the received information. In some embodiments, the method 500 may further include: performing a remote management function on the edge authentication node 110, the remote management function includes at least one of lock, offline, upgrade, configuration, or restart.

Figure 6:
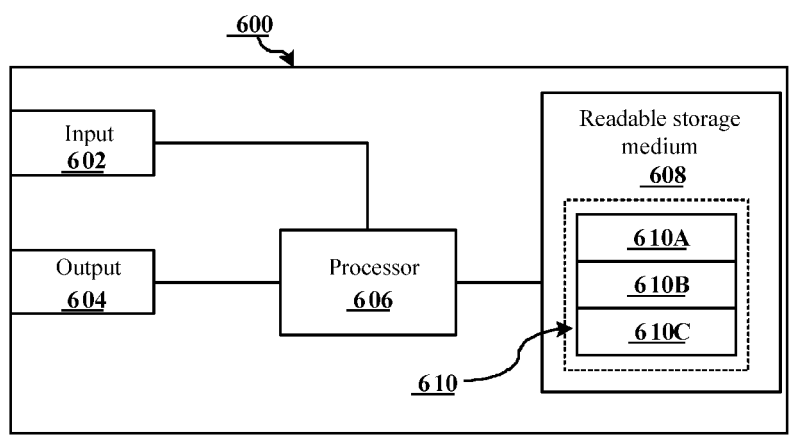
FIG. 6 is a block diagram showing an example hardware arrangement of an example electronic device for license authentication according to an embodiment of the present disclosure

FIG. 6 is a block diagram showing an example hardware arrangement 600 of an example electronic device for license authentication according to an embodiment of the present disclosure. The hardware arrangement 600 includes a processor 606 (e.g., a digital signal processor (DSP), a central processing unit (CPU), etc.). The processor 606 may be a single processing unit or multiple processing units for execution of different actions of the processes described herein. The arrangement 600 may also include an input unit 602 for receiving signals from other entities, and an output unit 604 for providing signals to other entities. The input unit 602 and the output unit 604 may be arranged as a single entity or separate entities.

In addition, the arrangement 600 may include at least one readable storage medium 608 in the form of non-volatile or volatile memory, such as an electrically erasable programmable read-only memory (EEPROM), a flash memory, and/or a hard drive. The readable storage medium 608 includes a computer program 610 that includes code/computer readable instructions, which when executed by the processor 606 in the arrangement 600 cause the hardware arrangement 600 and/or an electronic device including the hardware arrangement 600 to perform, for example, the process of any node described above with reference to FIGS. 3 to 5 and any modification thereof.

In some embodiments, the computer program 610 may be configured as a computer program code having an architecture of, for example, computer program modules 610A-610C. Therefore, in an exemplary embodiment when the hardware arrangement 600 is used in the edge authentication node 110, the code in the computer program of the arrangement 600 includes: a module 610A configured to receive a license authentication request from the client node 120, the license authentication request may include the client fingerprint information associated with the client node 120. The code in the computer program further includes: a module 610B configured to decrypt, based on the client fingerprint information, the license certificate associated with the client node 120 generated by the central authentication node 140, so as to obtain the license information associated with the client node 120. The code in the computer program further includes: a module 610C configured to transmit a license authentication response to the client node 120 based at least partially on the license information obtained.

In addition, in an exemplary embodiment when the hardware arrangement 600 is used in, for example, the central authentication node 140, the code in the computer program of the arrangement 600 includes: a module 610A configured to receive a license certificate generation request for generating a license certificate associated with the client node 120. The code in the computer program further includes: a module 610B configured to generate the license certificate associated with the client node 120 based on the request information included in the license certificate generation request. The code in the computer program further includes: a module 610C configured to provide the license certificate to the edge authentication node 110 associated with the client node 120, for subsequent authentication for the edge authentication node 110.

The computer program module can essentially execute each action in the process shown in FIGS. 3 to 5 to simulate an electronic device. In other words, when different computer program modules are executed in the processor 606, they may correspond to different functional units in the electronic device.

Although the code means in the embodiment disclosed above with reference to FIG. 6 is implemented as a computer program module, which when executed in the processor 606 causes the hardware arrangement 600 to execute the actions described above with reference to FIGS. 3 to 5, in alternative embodiments, at least one of the code means may be at least partially implemented as a hardware circuit.

The processor may be a single CPU (Central Processing Unit), but may also include two or more processing units. For example, the processor may include a general-purpose microprocessor, an instruction set processor and/or a related chipset and/or a special-purpose microprocessor (for example, an application specific integrated circuit (ASIC)). The processor may also include on-board memory for caching purposes. The computer program may be carried by a computer program product connected to the processor. The computer program product may include a computer readable medium having a computer program stored thereon. For example, the computer program product may be a flash memory, random access memory (RAM), read-only memory (ROM), EEPROM, and the above-mentioned computer program modules may be distributed to different program products in the form of a memory in the UE in an alternative embodiment.

So far, the present disclosure has been described in conjunction with the preferred embodiments. It should be understood that those skilled in the art can make various other changes, substitutions and additions without departing from the spirit and scope of the present disclosure. Therefore, the scope of the present disclosure is not limited to the specific embodiments described above, but should be defined by the appended claims.

In addition, the functions described in the present disclosure as being implemented by pure hardware, pure software and/or firmware can also be implemented by means of special hardware, a combination of general hardware and software, or the like. For example, functions described as being implemented by dedicated hardware (e.g., field programmable gate array (FPGA), application specific integrated circuit (ASIC), etc.) can be implemented by a combination of general-purpose hardware (e.g., central processing unit (CPU), digital signal processing (DSP)) and software, and vice versa.

The invention claimed is:

1. A method implemented in an edge authentication node for license authentication, comprising:
   receiving a license authentication request from a client node, the license authentication request comprises client fingerprint information associated with the client node;
   decrypting, based on the client fingerprint information, a license certificate associated with the client node generated by a central authentication node, so as to obtain license information associated with the client node;
   transmitting a license authentication response to the client node based at least partially on the license information obtained; and
   subsequent to the decrypting, based on the client fingerprint information, a license certificate associated with the client node generated by a central authentication node,
   extracting client public key information from the client fingerprint information;
   authenticating the license certificate by using the client public key information; and
   extracting license information in the license certificate, in response to the license certificate being authenticated successfully.

2. The method according to claim 1, wherein the decrypting, based on the client fingerprint information, a license certificate associated with the client node generated by a central authentication node comprises:
   determining a decryption key for the client node based on the client fingerprint information; and
   decrypting the license certificate by using the decryption key.

3. The method according to claim 1, wherein the authenticating the license certificate by using the client public key information comprises authenticating at least one of:
   whether a digital signature of the license certificate is legal or not;
   whether an issuing authority of the license certificate is a legal issuing authority or not; and
   whether a validity period of the license certificate has not expired.

4. The method according to claim 1, wherein the extracting license information in the license certificate comprises extracting at least one of an issuing authority, an authorization type, an authorization quantity, an authorization object, and authorization product information in the license certificate.

5. The method according to claim 1, wherein the transmitting a license authentication response to the client node based at least partially on the license information obtained comprises:
   transmitting the license authentication response to the client node based at least partially on the license information extracted, so as to permit the client node to perform a configuration based on the license information.

6. The method according to claim 1, further comprising: subsequent to the receiving a license authentication request from the client node,
   forwarding the license authentication request to the central authentication node; and
   receiving a central license authentication response in response to the license authentication request from the central authentication node,
   wherein the transmitting a license authentication response to the client node based at least partially on the license information obtained comprises:
   transmitting the license authentication response to the client node based on the license information obtained and the central license authentication response received from the central authentication node.

7. The method according to claim 1, wherein the license certificate is generated according to a JWT protocol.

8. The method according to claim 1, further comprising:
   recording, at the edge authentication node, log data of a license authentication session related to the license authentication request, in response to the license authentication request being received from the client node.

9. The method according to claim 1, wherein the client fingerprint information is identity authentication information for uniquely identifying and authenticating the client node.

10. The method according to claim 1, further comprising:
    collecting information about at least one of the edge authentication node, the client node, or the license certificate; and
    uploading the collected information to the central authentication node.

11. An edge authentication node for license authentication, comprising:
    a processor;
    a memory having instructions stored thereon that, when executed by the processor, cause the processor to perform a method comprising:
    receiving a license authentication request from a client node, the license authentication request comprises client fingerprint information associated with the client node;
    decrypting, based on the client fingerprint information, a license certificate associated with the client node generated by a central authentication node, so as to obtain license information associated with the client node;
    transmitting a license authentication response to the client node based at least partially on the license information obtained; and
    subsequent to the decrypting, based on the client fingerprint information, a license certificate associated with the client node generated by a central authentication node, extracting client public key information from the client fingerprint information;

authenticating the license certificate by using the client public key information; and extracting license information in the license certificate, in response to the license certificate being authenticated successfully.

12. A system for license authentication, comprising:

a central authentication node;

a edge authentication node; and one or more client nodes;

wherein the central authentication node for license authentication comprises: a processor; and a memory having instructions stored thereon that, when executed by the processor, cause the processor to perform a method comprising:

receiving a license certificate generation request for generating a license certificate associated with the client node;

generating the license certificate associated with the client node based on request information included in the license certificate generation request; and providing the license certificate to an edge authentication node associated with the client node, for subsequent authentication for the edge authentication node;

wherein the edge authentication node for license authentication, comprises: a processor; a memory having instructions stored thereon that, when executed by the processor, cause the processor to perform a method implemented in an edge authentication node for license authentication comprising:

receiving a license authentication request from a client node, the license authentication request comprises client fingerprint information associated with the client node;

decrypting, based on the client fingerprint information, a license certificate associated with the client node generated by a central authentication node, so as to obtain license information associated with the client node;

transmitting a license authentication response to the client node based at least partially on the license information obtained; and subsequent to the decrypting, based on the client fingerprint information, a license certificate associated with the client node generated by a central authentication node, extracting client public key information from the client fingerprint information;

authenticating the license certificate by using the client public key information; and extracting license information in the license certificate, in response to the license certificate being authenticated successfully.

13. A non-transitory computer-readable storage medium for storing instructions that, when executed by one or more processors, cause the one or more processors to perform a method comprising:

receiving a license authentication request from a client node, the license authentication request comprises client fingerprint information associated with the client node;

decrypting, based on the client fingerprint information, a license certificate associated with the client node generated by a central authentication node, so as to obtain license information associated with the client node; and transmitting a license authentication response to the client node based at least partially on the license information obtained; and subsequent to the decrypting, based on the client fingerprint information, a license certificate associated with the client node generated by a central authentication node, extracting client public key information from the client fingerprint information;

authenticating the license certificate by using the client public key information; and extracting license information in the license certificate, in response to the license certificate being authenticated successfully.

* * * * *